Sept. 23, 1969     J. MAREZ     3,469,193
AUTOMATIC CORRECTION SYSTEM FOR BRINGING RECORDED DATA
INTO SYNCHRONISM WITH A REFERENCE
Filed July 22, 1966     3 Sheets-Sheet 1

INVENTOR.
JOHN (NMI) MAREZ
BY
ATTORNEYS

Sept. 23, 1969                J. MAREZ                3,469,193
AUTOMATIC CORRECTION SYSTEM FOR BRINGING RECORDED DATA
INTO SYNCHRONISM WITH A REFERENCE
Filed July 22, 1966                              3 Sheets-Sheet 3

INVENTOR.
JOHN (NMI) MAREZ

ATTORNEYS

United States Patent Office 3,469,193
Patented Sept. 23, 1969

3,469,193
AUTOMATIC CORRECTION SYSTEM FOR BRINGING RECORDED DATA INTO SYNCHRONISM WITH A REFERENCE
John Marez, San Diego, Calif., assignor to the United States of America as represented by the Secretary of the Navy
Filed July 22, 1966, Ser. No. 567,160
Int. Cl. H04b 1/10
U.S. Cl. 325—323         9 Claims

ABSTRACT OF THE DISCLOSURE

A system for correcting errors in pulse encoded data signals generated by a repetitive source compares and detects whether recorded data is advanced or retarded relative to a reference and operates to either inhibit signals or to add signals, respectively, in order to bring the recorded data into synchronism with the reference. Due to the fact that the system operates to either inhibit signals or add signals in accordance with whether the recorded data is advanced or retarded, respectively, relative to a known or determinable reference, the two sources of data signals are brought into synchronism in a period of time not more than one-half of the cyclic repetitive period of the signal source which includes the repetitive reference signal. Accordingly, the system is most effective for synchronizing, for example, recorded target information from a radar input so that it may be played back in synchronism with other radar input information which may take the form, for example, of signals indicative of a landmass. Thus, dynamic target information may be recorded, played back, and brought into synchronism with static radar information to provide, in effect, an overlay for evaluation, test, or training purposes as may be desired.

---

The invention described herein may be manufactured and used by or for the Government of the United States of America for governmental purposes without the payment of any royalties thereon or therefor.

This invention is concerned with an automatic correction system and more particularly with such a system which is capable of correcting errors or discrepancies in recorded pulse encoded data signals generated by a repetitive source.

By employing presently known recording techniques and equipment, many types of data may be recorded for replay, review, evaluation or use in training programs. Quite frequently such data incorporates pulse encoded data signals which facilitate the playback of the recorded signals so that such recorded data may be properly synchronized as desired in order to accurately reproduce the meaningful content of the recorded data.

For example, the video data signals of a radar system may be recorded on magnetic tape or other suitable means to be played back and reproduce a visual representation of the recorded data at a later point in time. Such visual representation may take the form, for example, of a radar PPI or a B-scan type or other suitable presentation as may be desired or suitable to specific requirements dictated by the purpose for which such recorded data is utilized.

The recorded data, in addition to the video signals developed by a radar system, will generally include appropriate signals indicative of the orientation of the radar antenna developing the radar input signals so that the playback or reproduced signals may be properly oriented to reproduce a true and accurate representation of the signal data developed by the radar.

Referring to the PPI type of presentation in a radar system for explanatory and illustrative purpose, it will be apparent to those skilled in the art that the radar signal information developed at each azimuthal position of the radar antenna must be identified by suitable encoded data signals so that the recorded and reproduced PPI presentation will be properly oriented with respect to the azimuthal direction from which each increment of such original radar signal information was developed.

In the past, systems employed to record and play back radar signal information for reproducing a visual display of such information, have included azimuth reference signals which are useful to identify the proper orientation of the reproduced visual display, such as a PPI presentation, with respect to the original orientation of the radar antenna as it developed each azimuthal segment to complete the PPI presentation. Upon the play back of the recorded signals, the recorded reference signals were compared as to time displacement relative to the reference signals as actually generated from the radar equipment. If the recorded reference signals did not coincide in point of time with the reference signals generated by the radar equipment, prior art systems usually employed the technique of inhibiting the recorded signals until the recorded reference signal became coincident with the reference signal developed by the radar equipment, thus insuring substantially the same azimuthal orientation of the actually rotating radar antenna which develops the reference signal continuously and the radar information immediately following the recorded reference signal so that the visual radar display, which may take the form of a PPI presentation, would have substantially the same azimuthal orientation at each instant as that of the rotating radar antenna.

One obvious deficiency of the prior art system described above was the fact that there was a complete loss of display for that portion of the information cycle which transpired during the period while the recorded signal information was inhibited until a secondary reference and a recorded reference signal coincided in point of time.

In addition to the lack of output of the recorded information the prior art system, of course, involved a loss of time in that the lack of synchronism of the recorded and secondary reference signals when only a few degrees as in a PPI recorded signal data system would involve a delay of time encompassing the sweep of nearly 360° (360° less the small span of degrees by which the recorded signal was lacking in synchronism).

Accordingly, it is an object of the present invention to provide a system capable of automatically correcting the lack of coherency or synchronism in played back recorded pulse encoded data signals which were originally generated by a repetitive source.

Another primary object of the present invention is to provide such an automatic correction system which effectively adds or subtracts pulses to such pulse encoded data signals so as to bring the played back pulse encoded data signals into synchronism with the originating source.

Yet another object of the present invention is to provide such an automatic correction system which is operative to produce an output signal indicative of substantial concurrence of the reproduced reference signal with a reference signal generated by the originating source.

A further object of the present invention is to provide an automatic correction system as described wherein the substantial concurrence of the two reference signals occurs during a predeterminable maximum time interval.

Yet another most important object of the present invention is to provide such an automatic correction system for correcting errors in recorded pulse encoded data signals generated by a repetitive source which system is applicable generally to any type of recorded pulse encoded data employing repetitive reference signals.

The present system conceives a significantly improved automatic system for correcting the errors in recorded pulse encoded data signals generated by a repetitive source such as reference signals of a rotating antenna in a radar equipment. In accordance with the concept of the present invention, a reference signal generator which is responsive to a predetermined sequence of pulse encoded data signals from the repetitive source produces a distinctive reference signal. Appropriate recording means such as a magnetic tape recorder, for instance, is arranged to receive and record the pulse encoded data signals together with the reference signal described above. Play back means are provided for reproducing signals commensurate with the recorded pulse encoded data signals and the recorded reference signal, which means is connectable to impress its reproduced signals upon the reference signal generator for producing a secondary reference signal in response to that described predetermined sequence of reproduced pulse encoded data signals. Comparison means is connected to compare the time disposition of the reproduced reference signal with respect to the secondary reference signal and the comparison is operative to produce a first or second output responsive to one or the other of two undesired conditions, i.e. that the secondary reference signal is either advanced or retarded, respectively, in time relative to the reproduced reference signal. Reversible pulse counting means is connected to receive the first and second outputs of the comparison means and is responsive thereto so that upon reception of the first output the reversible counting means inhibits the transmission of the reproduced pulse encoded data signals to the reference signal generator until the reference signals are substantially concurrent in time in order that a recorded, played back and reproduced PPI presentation, for example, will be properly and accurately oriented relative to the instantaneous azimuthal disposition of the radar antenna of the equipment which originally developed the radar information. The second case of lack of proper azimuthal orientation of a PPI presentation which is recorded, played back and reproduced is where the secondary reference signal is retarded relative to the reproduced reference signal. In this case the reversible pulse counting means is responsive to the second output of the comparison means to add a sequence of pulse signals to the reproduced pulse encoded data signals until the two reference signals, i.e. the secondary reference signal and reproduced reference signal are substantially concurrent in time, insuring the desired result that the reproduced data is substantially coherent and in synchronism with the equipment which originally generated the signal information before it was recorded.

These and other features, advantages and objects of the present invention will be better understood from the following description of a typical embodiment of the present invention together with the illustrative drawings and its scope will be pointed out more particularly in the appended claims.

Figure 3A:
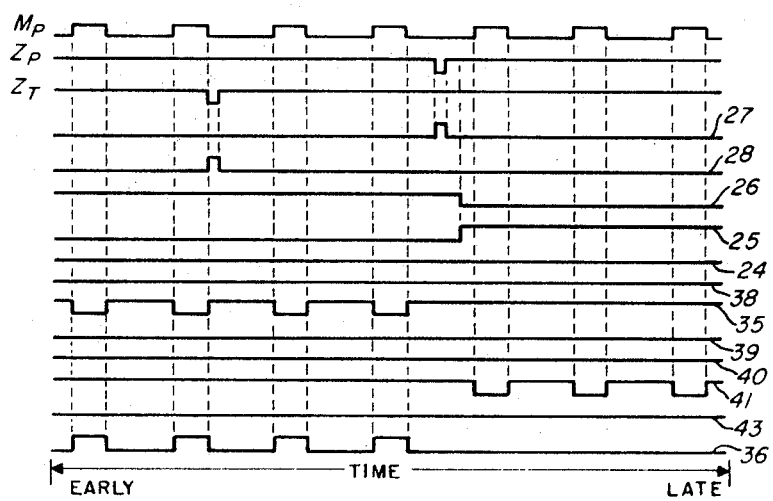
Figure 3B:
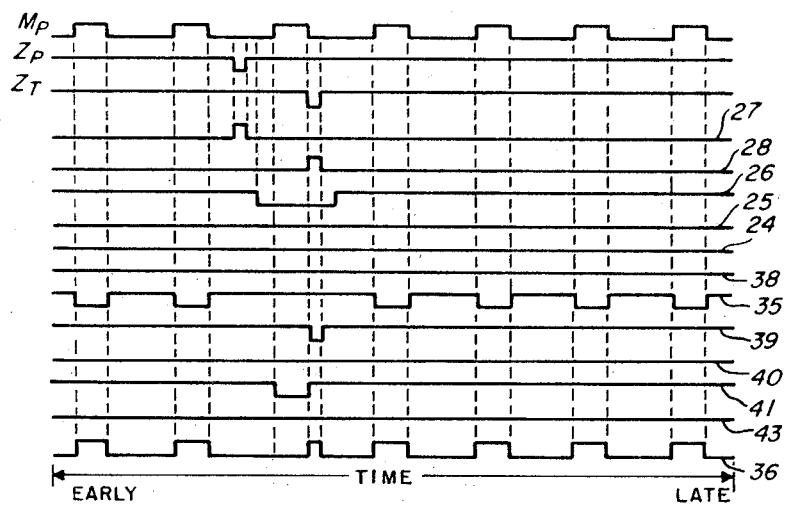
Figure 3C:
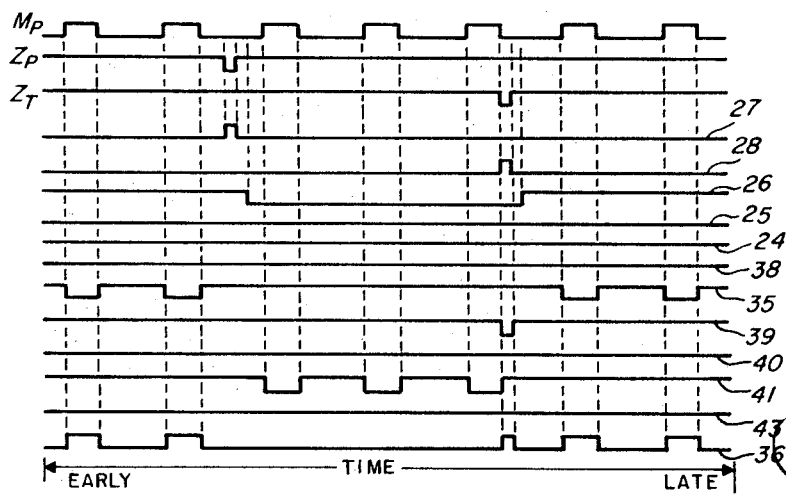

FIGS. 3a, 3b, and 3c are graphic illustrations of the typical waveforms which may be developed in the operation of the automatic correction of the present invention.

Typically, the present invention may be employed in conjunction with a recording system used to record and play back signal information in the general manner disclosed and described in U.S. Patent 3,181,139 and issued to W. E. Milroy, Apr. 27, 1965. That patent describes a system for recording radar information on magnetic tape together with reference signals in the form of pulses indicative of the azimuthal position of the radar antenna with respect to the radar signal information. Additionally that system provides reference pulses to insure orientation information with respect to such azimuthal pulse encoded information.

It is to be understood that the present invention is not limited to a rotationally driven radar signal source but may be employed with any source of signal information which repetitively generates pulse encoded data signals. Thus, the present invention is applicable to electronic scan radar antennas, sonar and other generically analogous signal sources.

Figure 1:
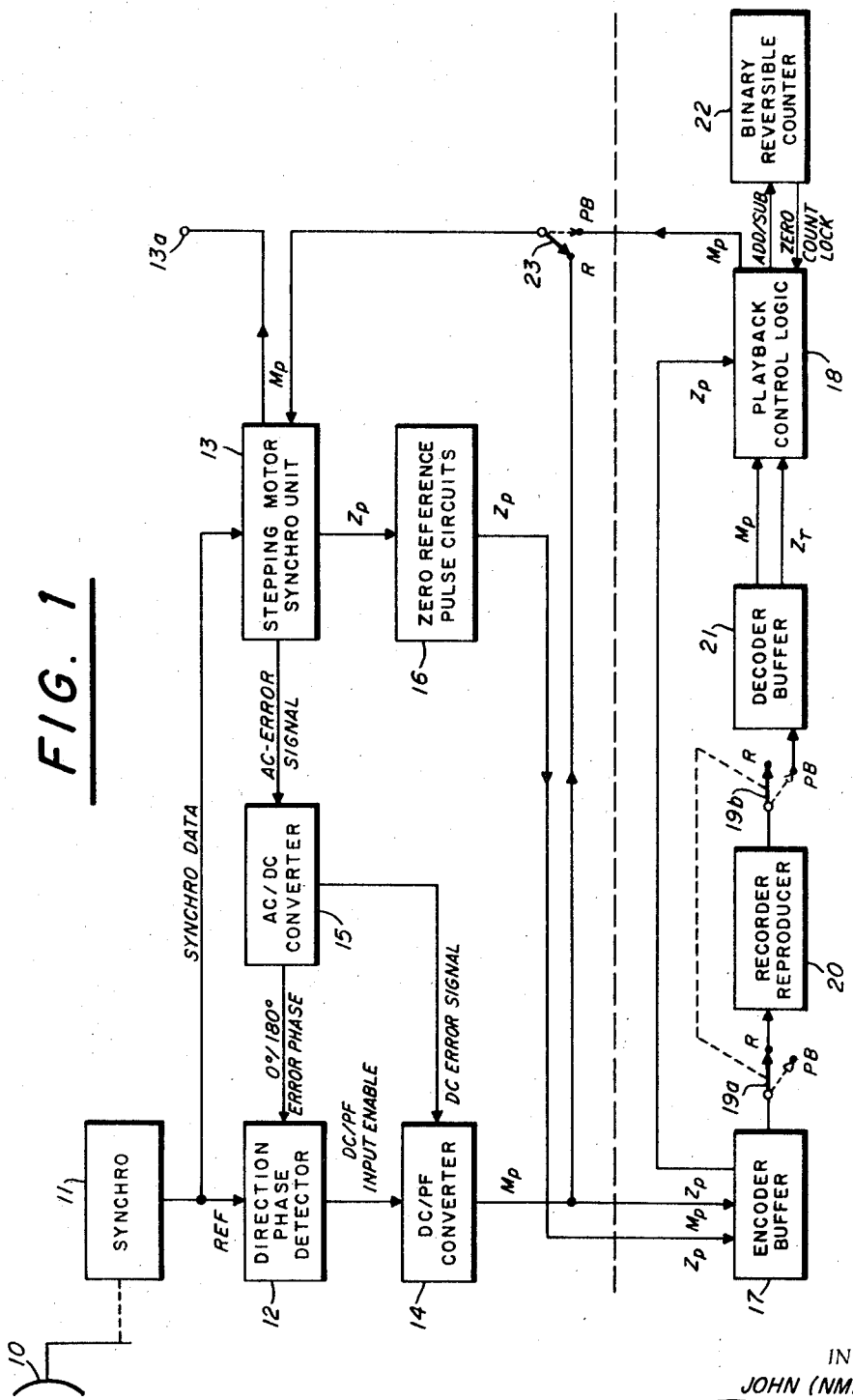
FIG. 1 illustrates a schematic block diagram of a radar system arranged to record and reproduce radar information signals and including the automatic correction system of the present invention.

Referring now to FIG. 1 there is illustrated a type of system which may employ the automatic correction features and advantages of the present invention to enhance the recording and reproduction of signal information. As shown, a radar antenna may be the source of signal information and provide appropriate synchro and reference signals by reason of the radar antenna 10 being operatively connected to a synchro or similar device 11. The synchro 11 provides an input to a direction phase detector 12 and a stepping motor synchro unit 13. The direction phase detector 12 is in turn connected to provide an enabling signal to a converter 14. An AC/DC converter 15 performs the function of accepting an AC input signal from the stepping motor synchro unit 13 and converting it to a DC output. The converter 14 generates an appropriate pulse frequency signal as a function of the DC error signal received from the AC/DC converter 15. The motor synchro unit 13 provides an output to a terminal 13A for synchro data employed in connection with the operation of the overall system which is not inherently a necessary part of the present invention. A second output of the stepping motor synchro unit 13 is connected to provide the input to a zero reference pulse circuit 16 which generates one of two inputs to an encoder buffer 17. The second input to the encoder buffer 17 is provided by the output of the converter 14.

The encoder buffer 17 develops two outputs, one of which is identical to the input received from the zero reference pulse circuit 16 and is connected to the playback control logic 18 of the present invention as indicated functionally in the schematic block diagram of FIG. 1. The second output of the encoder buffer 17 is connected to a ganged switch means 19A and 19B which is arranged to be connectable to a recorder reproducer 20 through the portion 19A of the ganged switch. The output of the recorder reproducer 20 is similarly arranged to be connectable to provide a reproduced signal input to a decoder buffer 21. The output of the decoder buffer 21 comprises two signals which are the second and third inputs to the playback control logic 18 in addition to the input previously mentioned as being received by the playback control logic 18 from the encoder buffer 17. The playback control logic component 18 develops either an add or subtract signal to a binary reversible counter 22 which, in turn, provides a zero count lock signal transmitted back to the playback control logic 18. The playback control logic 18 also provides an output which is connectable through an appropriate switch means 23 to provide an input to the stepping motor synchro unit 13. The arrangement of equipment illustrated in FIG. 1 operates to convert radar antenna synchro azimuth data to appropriate serial-digital form for recording on magnetic tape, for instance. The magnetic tape recording means has a reproducing capability so that the digital data are played back to be reconverted to analog data equivalent to the original radar antenna synchro azimuth information.

The equipment illustrated in FIG. 1 operates in two principal modes, one of which is the record mode and the second of which is the play back mode. During the record mode, the radar synchro information, in the form of analog signals received from the synchro 11, activates the stepping motor synchro unit 13 which output is converted into a variable DC level by the AC/DC converter unit 15. This output is converted into serial-type signals in the converter 14 and then mixed with a zero reference pulse which is generated by the zero reference pulse circuit 16. Thus, the resulting encoded signals which provide one of the inputs to the encoder buffer 17, contain both antenna positional information which is comprised of pulse encoded data and also antenna rotational information which may be recorded on a single tape track. In its play back mode of operation, the equipment of FIG. 1 operates upon the data recorded in the recorder-reproducer 20 so as to decode the recorded signal information in the decoder buffer 21, extracting two separate types of pulses, one of which is the stepping motor pulses in the form of encoded data signals and the second of which is a zero reference pulse. The stepping motor pulses are converted to the original synchro analog form and these data are available at the output of the stepping motor synchro unit 13 at terminal 13A to drive peripheral equipment as was previously mentioned. During the record mode of operation the switches 19A and 19B are in their upper or record position as is shown by the solid arrows of FIG. 1. Similarly the switch 23 is in its left hand position as indicated by the solid arrow. During record mode, antenna synchro signals are applied to the stator windings of a control transformer which causes an error signal to develop across its rotor windings. This error signal is processed in a synchro error-to-pulse frequency means comprising both the AC/DC converter 15 and the DC/PF converter 14 to generate serial pulses which correspond to the synchro-error signal. The serial pulses thus developed are used to drive a stepping motor (incorporated in the stepping motor synchro unit 13) which actuates the rotational movement of the antenna 10. The serial pulses thus generated are in an appropriate form for recording since through the synchro arrangement, their repetition rate is a function of the rate of change of position of the antenna azimuth.

In order to establish a position reference relative to the actual position of the antenna synchro at any given time, one zero reference pulse is generated for each complete antenna rotation. Such a reference pulse may be generated within the zero reference pulse circuit 16 by an appropriately arranged potentiometer which is responsive to a predetermined sequence of pulse encoded data signals from the previously mentioned control transformer to generate a reference signal for each complete antenna rotation. The output of the potentiometer may be appropriately processed by a pulse shaping circuit within the zero reference pulse circuit 16 and then mixed with the serial pulses which comprise the output of the converter 14 and impressed upon the encoder buffer 17 for mixing and producing a composite output of serial pulses together with a reference pulse. The direction phase detector 12 performs the function of phase correcting the synchro data when the rotation of the step servo synchros is in the proper direction and position.

In the playback mode of operation, the switches 19A and 19B as well as switch 23 are in the position indicated by the dashed line arrows of FIG. 1, i.e. the lower position with respect to the ganged switch 19 and the right hand position with respect to the switch 23. The recorder-reproducer 20 thus provides an output by connection through switch 19B to the decoder buffer 21 which comprises both reference pulses and azimuthal information pulses. The azimuthal information pulses are connected through the playback control logic 18 and the switch 23 to drive the stepping motor through the stepping motor synchro unit 13. Thus the recorded azimuth signals of radar antenna 10 are available and synchro data at the output of unit 13.

However, it will be recalled that upon rotation of the radar antenna 10, it will generate both azimuthal information pulses and reference pulses. The reference pulse generated in response to the playback of the recorded pulse encoded data which drives the antenna may be referred to as a secondary reference pulse. This secondary reference pulse is then compared as to synchronism and time disposition with respect to the recorded reference pulse in the playback control logic subsystem 18 which produces an output indicative of whether the secondary reference signal is advanced or retarded relative to the reproduced reference signal. Such corrections as may be necessary are completed by impressing the output of the playback control logic subsystem 18 upon the binary reversible counter 22 to effectively cause the addition or subtraction of a sufficient number of pulses to bring the secondary reference pulse into precise synchronism with the recorded reference pulse. When synchronism is achieved a "zero count lock" signal is produced by the counter 22. When no error exists between these two reference pulses, the recorded data and the original data derived from the radar correspond to each other and these data are available to drive peripheral equipments since the synchro-to-tape-to-synchro conversion is complete.

It is to be understood that the radar servomechanism drive system of the foregoing description is employed for illustrative purposes in explaining the operation of the present invention and forms no necessary part of the unique concept which is a system for automatically correcting errors in any type of recorded pulse encoded data signals generated by any repetitive source. Thus, the illustrative radar servomechanism drive system is but one of many such type sources.

The control logic section of the system illustrated includes the encoder buffer 17, the recorder-reproducer 20, the decoder buffer 21, the playback control logic 18 and the binary reversible counter 22 connected and arranged as illustrated in FIG. 1.

Ideally, the play back of any data from a recorder-reproducer should be an exact replica of the data originally recorded. However, it is generally not possible to achieve the ultimate ideal and therefore error corrections must be made by means which are external to the recorder-reproducer device. For example, when it is desired to record antenna synchro data of the type described in the foregoing illustration of a servomechanism drive system and to reliably play back such recorded data, errors as may be caused by tape drop-outs and transients must be eliminated or corrected. Error corrections of this nature are typical of the automatic correction function embodied in the present invention.

Figure 2:
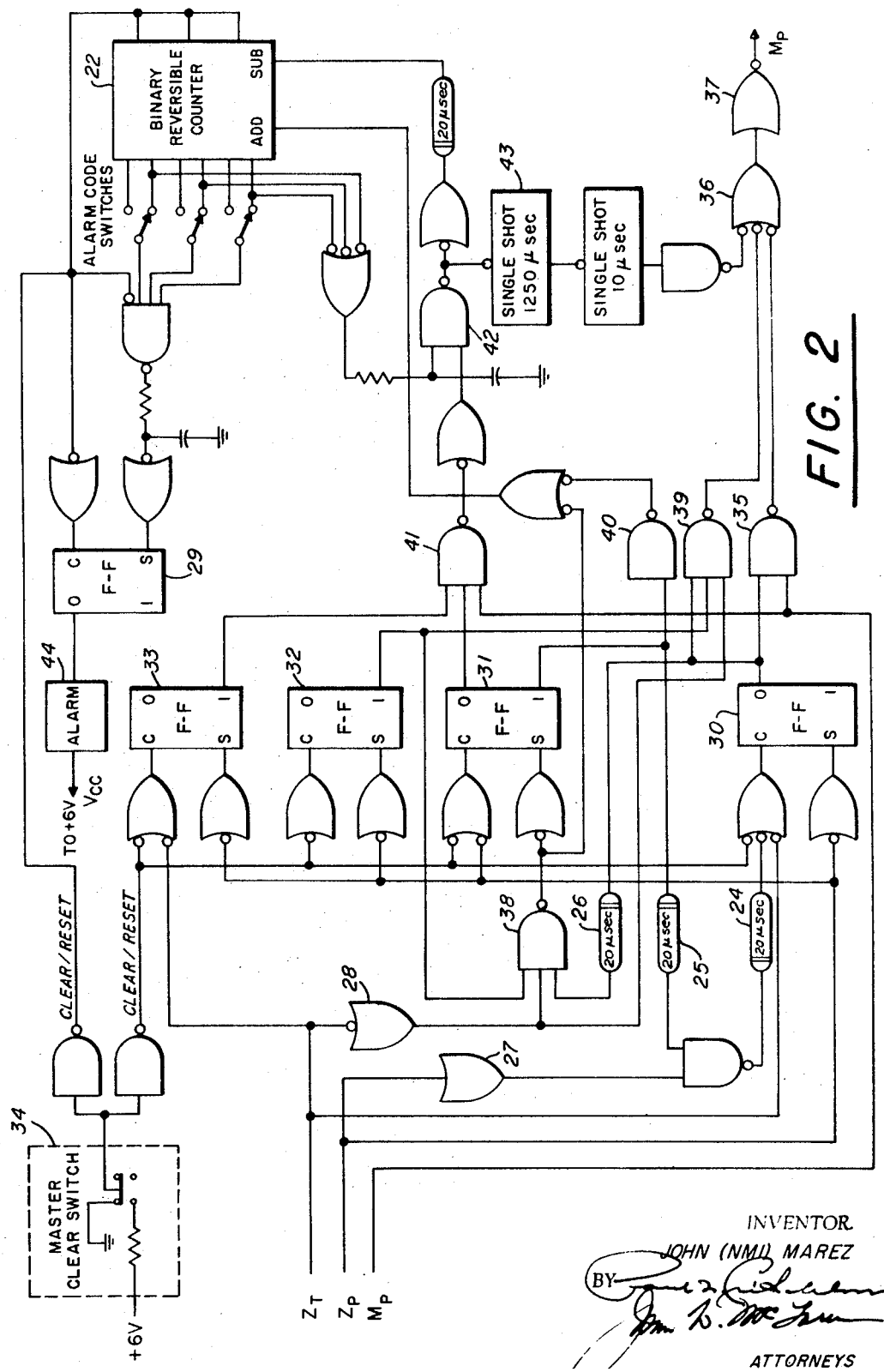
FIG. 2 is a more detailed schematic diagram of the playback control logic portion of the combination of equipment represented in FIG. 1 and which includes the automatic correction system of the present invention.

In describing the control logic section of the present invention as illustrated in FIG. 2, it will be helpful to bear in mind the process by which antenna positional and rotational data are generated and recorded on appropriate means such as a tape recorder. Analog antenna signals, such as are generated by a synchro, are converted into a series of pulses, the frequency of which is a function of the rotational rate of the antenna. Accordingly, the number of pulses per complete revolution is independent of the speed of rotation and is a function only of the indexing increment of the stepping motor and the gear ratio between the stepping motor and the control transformer of the synchro arrangement.

As a typical example, it may be assumed that the stepping motor may step fifteen rotational degrees per input pulse so that it accomplishes twenty-four steps in 360° or one complete revolution. If the gear ratio between the stepping motor and the control transformer of the synchro arrangement is 42 to 1, there will be 1,008 pulses generated for each complete revolution of the radar antenna and one reference pulse will be generated by the zero reference pulse circuits 16. Moreover, because the system of the present invention is so designed that the time disposition of the reference signal, relative to the secondary reference signal, is determined to either be advanced or retarded, an appropriate count of pulses can either be inhibited or added so as to bring the two into synchronism during a predetermined maximum time interval which cannot be more than one-half of the cyclic period of the repetitive source. This is so because in detecting the advance or retardation of one signal relative to another in a rotational repetitive signal source such as a radar antenna, the lack of synchronism is determined to lie in one of two 180° sectors, i.e., advanced or retarded, and therefore the correction necessary to bring synchronism into effect is accomplished within 180° or less rotation of the antenna, for example. This period which is limited because of the concept of the present invention may be termed the "predetermined maximum time interval" for effecting synchronism. The continuously generated rotational pulses will be called $M_P$ for identification, while the reference pulses will be called $Z_P$. These pulses are rendered distinguishable from each other by a pulse width or duration as indicated in FIG. 3a which shows several of the typical waveforms which may be generated in a system embodying the present invention.

In FIG. 3a, the first waveform illustrating the rotational pulses $M_P$ are shown to be of longer duration than the pulses $Z_T$. In a typical operation, the rotational pulses $M_P$ may be of 500 microseconds duration, while the zero reference pulses $Z_P$ are of 200 microseconds duration. Both of these signals, $M_P$ and $Z_P$, are combined in the encoder buffer 17 of FIG. 1 and recorded in the recorder-reproducer 20. When the recorded pulses are played back, they are fed to the decoder buffer 21 through switch 19B which senses the pulse width difference between the 200 microsecond rotational pulse widths and the 500 microsecond reference pulse width and separately transmits the rotational pulses $M_P$ and the reference pulses $Z_T$ to the playback control logic unit 13 as shown schematically in FIG. 1.

Details of the playback control logic section 18 are shown in FIG. 2 and its operation may be understood from the following description of typical instances of its error correction function and in the following description the play back reference pulse or reproduced reference signal will be identified by $Z_T$ for simplicity and clarity.

Initially, all of the control logic flip-flops 29, 30, 31, 32 and 33 are cleared by actuation of the "clear" switch 34 which puts the flip-flops 30 through 33 in the proper logical state for an initial synchronization cycle. Flip-flop 30 enables gate 35 and the $M_p$ pulse is transmitted to gate 36. This OR gate 36 drives an inverter 37 which, in turn, actuates the stepping motor controller driver 13 of FIG. 1 previously described.

Assuming that the $Z_T$ pulse should occur as part of the play back of reproduced signal data, the logical states of the flip-flops are uneffected as only the $Z_p$ pulse will change the state of flip-flops 30, 32 and 33. Hence, $M_p$ pulses from the output of gate 37 will continue to operate to drive the stepping motor synchro unit 13 of FIG. 1 which, internally, drives a $Z_p$ reference potentiometer to eventually generate a $Z_p$ pulse for proper synchronization. It is only a $Z_p$ pulse which can change the condition of flip-flops 30, 32 and 33.

Upon receiving a $Z_p$ pulse, the flip-flops 30, 32 and 33 are set. Flip-flop 30 then inhibits any further transfer of the $M_p$ pulses to the stepping motor. Flip-flop 32 primes one leg of the AND gates 38 and 39. Thus, the stepping motor synchro unit is in a static state awaiting the $Z_T$ pulse. Upon receiving the $Z_T$ pulse, the flip-flops 30 and 33 are reset, the motor pulse gate 35 is enabled, and $M_p$ pulses are again transferred to the stepping motor. This sequence completes the initial synchronization cycle as determined by the logic circuit of FIG. 2 and the time relationship of the operation and the waveforms developed are shown in FIG. 3a with each element identified by its numerical designation of FIG. 2.

FIG. 3a illustrates the time relationship between key elements of the combination of apparatus illustrated in FIG. 2 under conditions where the reference pulse $Z_p$ is retarded relative to pulse $Z_T$. In FIG. 3a, it will be noted that on the time scale shown at the bottom of the illustration, the $Z_p$ pulse occurs after the $Z_T$ pulse. The waveform 27 shows the operation of the inverter 27 of FIG. 2. As shown in FIG. 2, the inverter 27 receives the $Z_p$ pulse and produces an output which is an inverted version of the $Z_p$ pulse as illustrated in FIG. 3a.

The inverter 28 receives the $Z_T$ pulse and produces an output that is an inverted version of the $Z_T$ pulse as illustrated in FIG. 3a. The $Z_p$ pulse is received by the OR gate which is a portion of the flip-flop 30, enabling flip-flop 30 to produce an inverted output connected to a delay element 26. Accordingly, the output waveform of delay element 26 shows a change in state which is coincident with the 20 microseconds delay after the $Z_p$ pulse as is illustrated in FIG. 3a. The level of the waveform produced out of delay element 26 is determined by the state of flip-flop 30. Accordingly, since the flip-flop 30 was reset by actuation of the clear reset input initially, it changes from a reset to a set state by receiving the $Z_p$ pulse as is reflected in the output of element 26 illustrated in FIG. 3a.

The output of element 25 is a waveform which changes state 20 microseconds after its input. The input to element 25 is determined by the output of flip-flop 31. The output of flip-flop 31 is responsive to the input received by two OR gates which are associated with it as illustrated in FIG. 2. The lower OR gate is responsive to the output of an AND gate 38 which receives as one of its inputs the output of delay element 26. The second of its inputs is the inverted $Z_T$ pulse received from the inverter 28. The third of its inputs is the inverted $Z_p$ pulse received as an output of the flip-flop 32 which achieves a set condition as a result of the $Z_p$ pulse received from its associated OR gate. Accordingly, as illustrated in FIG. 3a, the $Z_T$ pulse is received by gate 38 firstly, subsequently the $Z_p$ pulse is received by gate 38 and the output of flip-flop 32 and lastly, the third signal required to actuate the AND gate 38 is received as a 20 microsecond delay signal which is the output of delay element 26. On occurrence and coincidence of all three signals, AND gate 38 produces an output which is transmitted to the OR gate associated with flip-flop 31 producing the 20 microsecond delay output in an inverted form which is shown by the waveform 25 as illustrated in FIG. 3a.

The output of element 24 depends upon the coincidence of a $Z_p$ pulse and a 20 microsecond delayed $Z_T$ pulse received from the output of flip-flop 31. Since this coincidence does not occur under the conditions described, the waveform 24 as illustrated in FIG. 3 reflects no change of state.

The output of element 38 of FIG. 2 is determined by the relative conditions and outputs of delay element 26, inverter 28, and flip-flop 32. The output of AND gate 35 is determined by the coincidence of inputs received which comprise the motor pulses $M_p$ and the output of flip-flop 30. Accordingly, $M_p$ pulses are produced as an output of element 35 until a $Z_p$ pulse occurs, actuating flip-flop 30 and inhibiting the AND gate 35 to produce a series of inverted $M_p$ pulses until the $Z_p$ pulse occurs as is illustrated by waveform 35 of FIG. 3a.

The output of gate 39 is related to the $Z_p$ pulse and is determined by the condition of flip-flops 30, 32, and gate 28 of FIG. 2 and in the condition illustrated in FIG. 3a, does not reflect a change of state. Similarly, the output of gate 40 is related to both the $Z_T$ and the $M_p$ pulses and its output is controlled by the condition of flip-flop 31 which is the illustration of FIG. 3a reflects no change of state.

The output of element 41 of FIG. 2 controls the subtraction effected by the reversible counter 22 and the output of gate 41 is controlled by the condition of flip-flop 33 and 31 as well as the $M_p$ pulses. Since the coincidence of necessary input signals to gate 41 does not occur until the $Z_p$ pulse loses an output from flip-flop 33, and subsequently a 20 microsecond delay version of the $Z_p$ pulse pulse produces an output from flip-flop 31, the AND gate 41 is not enabled until after the occurrence of the two previously described conditions as is illustrated in its time relationship by the waveform 41 of FIG. 3a.

The single shot element 43 introduces a 1250 microsecond delay for extra $M_p$ pulses to be inserted between the regular $M_p$ pulses during the catch up cycle and is shown as producing no outputs other than the conditions represented in FIG. 3a. The output of OR gate 36 comprises an inverted version of inputs received from the AND gate 35, the AND gate 39, or the single shot element 43. Since its only inputs during the cycle of time illustrated are the inputs received from the AND gate 35, the output of the OR gate 36 is illustrated as an inverted version of the input received from AND gate 35.

FIG. 3b illustrates a condition when $Z_P$ and $Z_T$ are in synchronization. The output of inverter 27 is an inversion of the received $Z_P$ pulse while the output of inverter 28 is the inversion of the $Z_T$ pulse. The output of the delay element 26 is a 20 microsecond delayed signal related to the condition of flip-flop 30 which becomes set at the $Z_P$ pulse and reset at the $Z_T$ pulse. The resetting of the flip-flop 30 at the time of the occurrence of the $Z_T$ pulse enables the $Z_P$ pulses to be generated at gates 35, 36, and 37, to continue operation of the stepping motor 13 of FIG. 1 which receives the output $M_P$ pulses of the gate 37 of FIG. 2.

The output of delay element 25 is a 20 microsecond delayed signal, the level of which is determined by the condition of flip-flop 31 and under conditions of synchronization as illustrated by the waveforms of FIG. 3b, the level remains in its relatively high state. The output of gate 38 is normally at a high level under conditions of synchronization, which level is determined by the conditions of flip-flop 32, inverter 28, and delay element 26.

The output of the AND gate 35 comprises $M_P$ pulses which are controlled by the conditions of flip-flop 30, which, in turn, is controlled by the occurrence of the $Z_P$ and the $Z_T$ pulses. The output of the gate 39 is related to the $Z_T$ pulses and the conditions of the gate 28, flip-flop 32, and flip-flop 30. During normal operation, flip-flop 30 inhibits one $M_P$ pulse at gate 35 and the inhibited pulse is made up by the output of gate 39. It should be noted that when the $Z_P$ pulse occurs, it always does so at the end of an $M_P$ pulse. Therefore, the condition of gate 39 is set during occurrence of the $Z_P$ pulse.

The output of gate 40 is normally at a high level when $Z_P$ and $Z_T$ pulses are in synchronization and hence no output signals are transmitted to reversible counter 22. Under these conditions, the flip-flop 31 output to gate 40 keeps the input inhibited so that there are no additional pulses generated. This is proper and confirms the synchronization of the $Z_P$ and $Z_T$ pulses.

The output of gate 41 is dependent upon $M_P$ pulses and the conditions of flop-flop 31 and flop-flop 33. During a condition of proper synchronization, the output of gate 41 has no effect because it is inhibited by gate 42 with the binary counter at zero. The output of single shot 43 is always at a low level and has no effect during conditions of synchronization since gate 42 provides no output. The output of gate 36 depends upon the gate 35 and gate 39 during conditions of synchronization. The gate 35 provides $M_P$ pulses as outputs and gate 39 provides one $Z_T$ pulse per revolution to account for one inhibited $M_P$ pulse which is caused by the logic of the circuitry and produces the output of waveform 36 as shown in FIG. 3b which includes $M_P$ pulses together with one $Z_T$ pulse replacing a single inhibited $M_P$ pulse.

In FIG. 3c, the waveforms illustrate conditions where the reference pulse $Z_P$ occurs early relative to the $Z_T$ pulse. Under these conditions, the $Z_P$ pulse sets flip-flop 30 which inhibits additional pulses from being generated at gates 35, 36, and 37. The flip-flop 30 remains in this condition until the $Z_T$ pulse resets flip-flop 30 enabling gate 35 and consequently, $M_P$ motor pulses are generated once again at gates 36 and 37 to be transmitted to the stepping motor. When this condition occurs the $Z_P$ pulses and $Z_T$ pulses are once again in proper synchronized relationship to each other. As illustrated under these conditions, and the waveforms of FIG. 3c, waveform 27, is an inverted version of the $Z_P$ pulse. The output of 28 is an inverted version of the $Z_T$ pulse. The output of 26 is the output of flip-flop 30 in a 20 microsecond delayed form.

The output of element 25 is a constant level determined by the state of flip-flop 31. The output of element 24 is a constant level as determined by the output of delay element 25 and gate 27. The output of element 38 is determined by the conditions of gate 28, flip-flop 32, and the output of delay element 26; as is shown under these conditions, the output of element 38 is normally a constant high level signal.

The output of gate 35 is dependent upon its reception of $M_P$ pulses and the condition of flip-flop 30. As shown under the conditions illustrated in FIG. 3c, element 35 produces an output of $M_P$ pulses except between the occurrence of the $Z_P$ and $Z_T$ pulses. This situation is caused to occur in order to allow the $Z_T$ pulse to be transmitted before resuming the generation of $M_P$ pulses at a time when the system would be synchronized.

The output of element 39 is a $Z_T$ pulse to replace the single $M_P$ pulse which has been inhibited one time for each revolution. It should be noted that the outputs of the gates 35 and 39 are logically combined at the gate 36. The output of element 41 is determined by the condition of flip-flops 33 and 31 as well as the reception of $M_P$ pulses. This output has no effect upon the gates 42 and 36 under the conditions illustrated in FIG. 3c.

The output of gate 36 as previously mentioned is the composite waveform produced by gates 35 and 39 as well as the output of the single shot element 43 and that composite waveform comprising $M_P$ pulses and one $Z_P$ pulse is transmitted through gate 37 for connection to the stepping motor which such pulses are employed to drive.

When transients occur on the played back reproduced signal, they may have the character generally of motor pulses and thus be fictitious signals. Such pulses may advance the stepping motor which would cause a $Z_P$ reference pulse to be generated prior to its correct time relationship to the reference $Z_T$. Therefore, the reference pulses $Z_P$ and $Z_T$ would not be in step and the error created by this condition would be corrected in the playback control logic section in the following manner: Reference pulse $Z_P$ sets the flip-flop 30 which inhibits any more motor pulses $M_P$ from getting to the stepping motor. The flip-flop 30 remains set until the reference pulse $Z_T$ resets it enabling the gate 35. Motor pulses are thus routed to the stepping motor and the reference pulses $Z_P$ and $Z_T$ once again have their proper relationship with respect to each other. This condition and the relationship of the several waveforms developed is illustrated by FIG. 3b.

When signals in the form of pulses are lost in transmission within the equipment or fail to be properly recorded, the $Z_P$ reference pulse is received late by the control logic. As a result, the $Z_T$ reference pulse precedes the $Z_P$ reference pulse by a time interval which is equal to the number of pulses missing multiplied by the motor pulse period. Consequently, there is a lack of synchronism between the two reference pulses $Z_P$ and the played back reproduced signal data will be incorrect.

In this case, the playback control logic as shown in FIG. 2 operates in the manner described hereinafter. The reference pulse $Z_T$ sets the flip-flop 31, enabling the gate 40. Flip-flop 30 is uneffected and motor pulses are fed both the stepping motor and the "add" line of the reversible binary counter indicated by the numeral 22, the same numerical designation as it bore in FIG. 1. The reference pulse $Z_P$ resets the flip-flop 31, disabling gate 40 and priming gate 41. The count which is stored in the binary counter 22 is the equivalent of the number of $M_P$ pulses between the two references pulses $Z_T$ and $Z_P$. Basically, the purpose of the binary reversible counter 22 is to add a number of $M_P$ pulses which is equal to the number of $M_P$ pulses between the $Z_P$ pulse and the $Z_T$ pulse when the latter two are not synchronized. Hence, the counter 22 stores the count of pulses which is equal to the number of pulses by which $Z_P$ is out of phase with $Z_T$. The added pulses are generated by gate 40 and gate 38. When a $Z_P$ and 42 allow subtraction by the counter of each succeed-pulse occurs, gates 40 and 38 are inhibited and gates 41 ing $M_P$ pulse until the counter 22 reaches a zero count. Each output of gate 42 also generates an extra $M_P$ pulse to be inserted and used between the normal $M_P$ pulses. In effect, this causes the stepping motor to advance at a commensurately faster rate until the pulses $Z_P$ and $Z_T$ are back in proper synchronization. The zero counter lock signal is used to inhibit further subtraction by the counter in order not to generate more extra $M_P$ pulses beyond those $M_P$ pulses which are necessary to bring the pulses $Z_T$ and $Z_P$ into synchronization. Upon sensing a zero count at the output of the binary counter 22, gate 42 inhibits any further transfer of additional $M_P$ pulses to single-shot pulse generator 43 so that it ceases to generate correction pulses. Accordingly, the stepping motor has been actuated by a number of pulses which is equivalent to the number of $M_P$ pulses dropped in the one complete cycle of the playback reproduced data signals and the error created by reason of such dropped pulses has been corrected.

The waveform generated by the various elements of the control logic section illustrated in FIG. 2 are shown graphically in their time relationships in FIG. 3c.

If no transient signals or drop-out signals occur in a data cycle error corrections are not necessary and the equipment remains synchronized to the play back reproduced signals coming from the tape recorder-reproducer.

The equipment of FIG. 2 is also arranged so that if drop-out errors exceed a fixed number in a single data cycle, an audible alarm, as shown at 44, alerts the operator to the excessive error condition. Errors equal to the binary counter total or of lesser magnitude are, of course, corrected automatically by the equipment and those skilled in the art will appreciate that the audible alarm can be arranged to operate when error counts any selected number as may be desired for the particular equipment.

It will be evident that the operation of the present invention affords automatic correction, not only of the errors that may occur by reason of unwanted transients or drop-out pulse errors such as can occur in the data derived from a servomechanism system driving a radar antenna, but will operate equally as well and advantageously for correcting errors in any recorded pulse encoded data signals which are generated by a repetitive source. Moreover, the concept of the present invention may be embodied in variant forms of logic circuitry which may be designed and devised in accordance with established techniques.

What is claimed is:

1. An automatic correction system for correcting errors in recorded pulse encoded data signals generated by a repetitive source comprising:

a reference signal generator responsive to a predetermined sequence of pulse encoded data signals from said repetitive source for producing a reference signal, recording means for receiving and recording said pulse encoded data signals and said reference signal, means for reproducing signals commensurate with said recorded pulse encoded data signals and said reference signals, said means being connectable to impress its reproduced signals upon said reference signal generator for producing a secondary reference signal in response to said predetermined sequence of reproduced pulse encoded data signals, comparison means for comparing the time disposition of said reproduced reference signal with said secondary reference signal, said means being operative to produce a first or second output responsive to whether said secondary reference signal is advanced or retarded, respectively, in time relative to said reproduced reference signal, and reversible pulse counting means connected to receive said first and second outputs of said comparison means, said counting means being responsive to said first output to inhibit the transmission of said reproduced pulse encoded data signals to said reference signal generator until said reference signals are substantially concurrent in time, and responsive to said second output signals for adding a sequence of pulse signals to said reproduced recorded pulse encoded data signals until said reference signals are substantially concurrent in time.

2. An automatic correction system as claimed in claim 1 wherein said comparison means is operative to produce an output signal indicative of substantial concurrence of said reference signals.

3. An automatic correction system as claimed in claim 1 wherein said substantially concurrent reference signals occur during a predetermined maximum time interval.

4. An automatic correction system as claimed in claim 1 wherein said repetitive source generates pulses spaced in time in accordance with the disposition of a driven member.

5. An automatic correction system as claimed in claim 1 wherein said repetitive source generates like signals and said reference signal generator produces signals having at least one characteristic distinguishable from said like signals.

6. An automatic correction system as claimed in claim 1 wherein said repetitive source generates signals of a constant first pulse width and said reference signal generator produces signals of a constant second pulse width distinguishably different from said first pulse width.

7. An automatic correction system as claimed in claim 1 wherein said reference signal generator is responsive to a predetermined sequence of pulse encoded data signals for producing a reference signal between successive pulse encoded data signal sequences.

8. An automatic correction system as claimed in claim 1 wherein said repetitive source develops a pulse signal for each incremental change in the disposition of an associated driven member.

9. An automatic correction system as claimed in claim 1 wherein said repetitive source develops a pulse signal for each increment of angular change in the rotational disposition of an associated driven member.

References Cited

UNITED STATES PATENTS 3,017,462   1/1962   Clark et al. _____ 178—69.5

ROBERT L. GRIFFIN, Primary Examiner

WILLIAM S. FROMMER, Assistant Examiner

U.S. Cl. X.R.

325—42; 178—69.5